(12) United States Patent
Etgen et al.

(10) Patent No.: US 10,534,101 B2
(45) Date of Patent: Jan. 14, 2020

(54) SEISMIC ADAPTIVE FOCUSING

(71) Applicants: John Theodore Etgen, Houston, TX (US); Chunlei Chu, Houston, TX (US)

(72) Inventors: John Theodore Etgen, Houston, TX (US); Chunlei Chu, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 1013 days.

(21) Appl. No.: 14/677,585

(22) Filed: Apr. 2, 2015

(65) Prior Publication Data

US 2015/0293248 A1    Oct. 15, 2015

Related U.S. Application Data

(60) Provisional application No. 61/977,615, filed on Apr. 9, 2014, provisional application No. 61/978,610, filed on Apr. 11, 2014.

(51) Int. Cl.
     *G01V 1/00*      (2006.01)
     *G01V 1/28*      (2006.01)
     (Continued)

(52) U.S. Cl.
     CPC .............. *G01V 1/345* (2013.01); *G01V 1/282* (2013.01); *G01V 1/30* (2013.01); *G01V 1/362* (2013.01);
     (Continued)

(58) Field of Classification Search
     CPC ........... G01V 1/303; G01V 2210/1212; G01V 2210/1295; G01V 2210/675;
     (Continued)

(56) References Cited

U.S. PATENT DOCUMENTS 4,206,509 A    6/1980   Ruehle
4,797,861 A *   1/1989   Beasley ................. G01V 1/301
                                                         367/50
(Continued)

OTHER PUBLICATIONS

PCT Search Report dated Jun. 18, 2015.
(Continued)

*Primary Examiner* — Brian Turner
(74) *Attorney, Agent, or Firm* — Robert Hsiao

(57) ABSTRACT

A method for use in seismic exploration comprises: accessing a set of seismic data representative of a subterranean geological formation and a subsurface attribute model of the subterranean geological formation; performing a wavefield extrapolation on the seismic data in the subsurface attribute model; applying the time-shift extended imaging condition to the extrapolated wavefields; forming shot-indexed, time shift gathers for each image pixel of the subsurface attribute model from the conditioned extrapolated wavefields; adaptively focusing the gathers; and stacking the adaptively focused gathers; and imaging the subterranean geological formation from the stacked, adaptively focused gathers. The method may, in some aspects, be realized by a computing apparatus programmed to perform the method or as a set of instructions encoded on a non-transitory program storage medium that, when executed by a computing apparatus, perform the method.

20 Claims, 10 Drawing Sheets

(51) Int. Cl.
*G01V 1/30* (2006.01)
*G01V 1/38* (2006.01)
*G01V 1/36* (2006.01)
*G01V 1/34* (2006.01)

(52) U.S. Cl.
CPC ...... *G01V 2210/57* (2013.01); *G01V 2210/66* (2013.01); *G01V 2210/74* (2013.01)

(58) Field of Classification Search
CPC ..... G01V 2210/512; G01V 2210/6222; G01V 2210/1425
See application file for complete search history.

(56) References Cited

U.S. PATENT DOCUMENTS

| | | |
|---|---|---|
| 5,764,516 A | 6/1998 | Thompson |
| 2010/0118653 A1* | 5/2010 | He .......................... G01V 1/303 367/57 |

OTHER PUBLICATIONS

F. Kirchheimer: "Robust residual statics by means of interface lag estimates" SEG Technicial Program Expanded Abstracts 1986, Dec. 31, 1986 (Dec. 31, 1986), pp. 589-591, XP055179459.

* cited by examiner

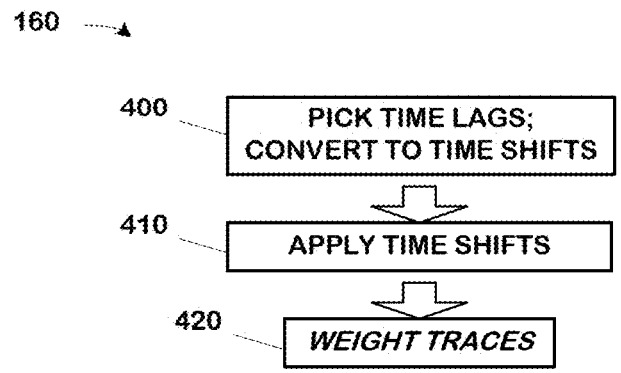
FIG. 4
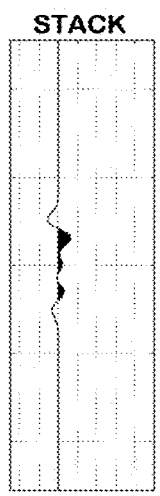 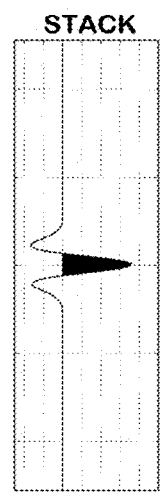
FIG. 5A   FIG. 5B

SEISMIC ADAPTIVE FOCUSING

CROSS-REFERENCE TO RELATED APPLICATIONS

This application claims benefit of U.S. provisional patent application Ser. No. 61/977,615 filed Apr. 9, 2014, and entitled "Seismic Adaptive Focusing" (BP Ref: 500343P1), which is hereby incorporated herein by reference in its entirety. This application also claims benefit of U.S. provisional patent application Ser. No. 61/978,610 filed Apr. 11, 2014, and entitled "Seismic Adaptive Focusing" (BP Ref: 500343P2), which is hereby incorporated herein by reference in its entirety.

STATEMENT REGARDING FEDERALLY SPONSORED RESEARCH OR DEVELOPMENT

Not applicable.

BACKGROUND

Field of the Invention

Embodiments of techniques disclosed herein generally pertain to seismic exploration and, more particularly, to the imaging of seismic data.

Background of the Technology

This section of this document introduces information about and/or from the art that may provide context for or be related to the subject matter described herein and/or claimed below. It provides background information to facilitate a better understanding of the various aspects of the presently disclosed technique. This is a discussion of "related" art. That such art is related in no way implies that it is also "prior" art. The related art may or may not be prior art. The discussion in this section of this document is to be read in this light, and not as admissions of prior art.

Seismic surveying is the practice of studying subterranean formations from reflections by those formations of acoustic waves. This includes imparting acoustic waves into a natural environment so that they may enter the earth and travel through the subterranean geological formations of interest. During their travels through the formations, certain features of the formations will reflect the waves back to the surface where they are recorded.

The recorded reflections are then studied to ascertain information about those formations. The seismic data derived from the recorded reflections is processed to, for example, image the subterranean formations that generated the reflections in some cases. The images, and models derived from them, can help identify subsurface resources. Most notably, these resources may include fluid hydrocarbons such as petroleum and natural gas. The techniques may be applied to the location of other kinds of resources as well.

The study of the recorded reflections involves digitizing the recordings and then processing them as a seismic data set. Seismic data sets are very large even by modern computing standards. The processing is also computationally intensive. The industry therefore uses large, powerful computing systems with large, high capacity storage to perform this part of the analysis.

The analysis itself may take many forms depending upon the end use of the resultant product. Frequently, the analysis models the subterranean formation based on one or more of its physical attributes to image it for analysis. The model, or "image", may or may not be rendered for human perception depending, again, on the end use. There are many techniques that are used in varying combinations as is well known and commonly practiced in the art.

One common technique used in imaging seismic data is known as data "migration". One of the tools frequently used in migration is a "velocity model" (or more generally, a "subsurface attribute model", which might also include anisotropy parameters, shear-wave velocity, density, etc) that is generated from the seismic data. A velocity model is a representation of the geological formation that can be used in analyses of various types, typically resulting in an image of the subterranean formation from which the seismic data were acquired. The quality of these images frequently depends upon the quality of the velocity model. A poor quality velocity model will yield a poor migration and, ultimately, a poor image.

Seismic image quality dependency on the migration velocity model becomes progressively higher as geological complexity increases. Advancement in more theoretically rigorous model estimation technologies such as waveform inversion will gradually improve model building capabilities over time to meet this challenge, but it is also important to realize that certain degrees of imperfection in the velocity models will always be expected, at least in the foreseeable future. There is therefore a need to adjust/improve images as part of the migration process to account for this imperfection, and furthermore to mitigate the inadequacy of the physics used at various stages in the data processing pipeline.

For example, in the Gulf of Mexico where salt is the dominant structural element, inadequate velocity models have long been recognized as one of the main obstacles to the delivery of good quality seismic images. Large fractions of the computing cycles devoted to velocity estimations are consumed by salt body delineations, often also involving a great deal of interpretation work. This labor-intensive workflow for the most part is centered around fine-tuning the details of the salt geometry, on a scale that is within the resolving power of seismic signals but is unfortunately out of the reach of the current velocity estimation tools.

The presently disclosed technique is directed to resolving, or at least reducing, one or all of the problems mentioned above. Even if solutions are available to the art to address these issues, the art is always receptive to improvements or alternative means, methods and configurations. Thus, there exists a need for techniques such as that disclosed herein.

BRIEF DESCRIPTION OF THE DRAWINGS

The accompanying drawings, which are incorporated in and constitute a part of this specification, illustrate embodiments of the invention and together with the description, serve to explain the principles of the invention. In the figures:

FIG. 4 illustrates one particular embodiment of the adaptive focusing for the process flow of FIG. 1.

FIG. 5A-FIG. 5B graphically illustrate the efficacy of the data processing flow in FIG. 1.

DESCRIPTION OF THE EMBODIMENTS

Figures 1, 2:
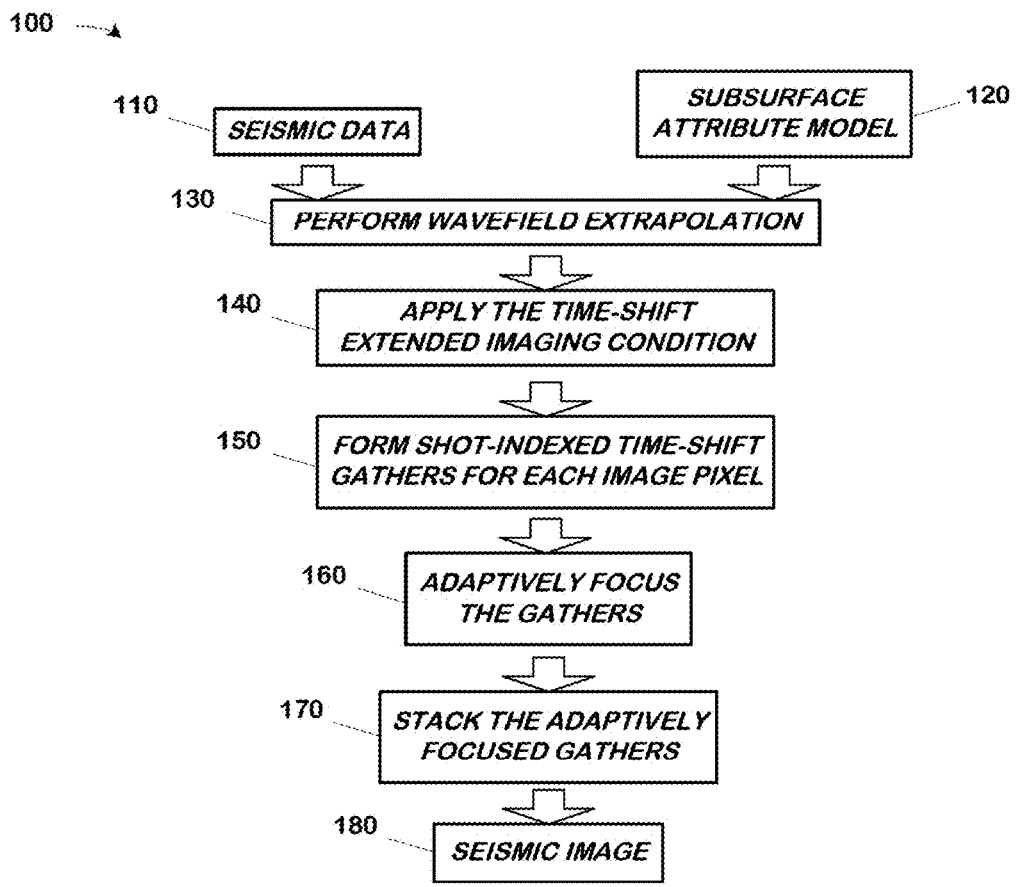
FIG. 1 illustrates a seismic data processing flow in accordance with one particular aspect of the presently disclosed technique.
FIG. 2 depicts selected portions of the hardware and software architecture of an exemplary computing apparatus on which that aspect of the presently disclosed technique shown in FIG. 1 may be performed.

The presently disclosed technique includes a method for improving images derived from seismic reflection data using an adaptive focusing approach that automatically recognizes and removes short-wavelength time shift distortions from seismic data during conventional seismic migration calculations and adaptively weights the image according to measures of its reliability. One application is to improving images below complex velocity overburden, particularly overburden features that are deep in the subsurface of the Earth and are difficult to characterize by other means and are not well incorporated into the imaging velocity model. However, the technique will find other applications, as will become apparent to those skilled in the art having the benefit of this disclosure.

The method operates inside an otherwise conventional seismic migration algorithm by applying an extended imaging condition with a series of positive and negative time shifts, including zero (a zero time shift corresponding to the conventional imaging condition), and preserving the migrated records without stacking. If the different records have been migrated with an incorrect velocity model, the images will not align perfectly at zero time shift. In the invention, the time-shifted versions of each image point are compared to estimate a time shift at each image point and record that corrects for these image-alignment errors. Furthermore, the greater the required time shift, the greater the chance that the corrected image contribution from that trace is unreliable, in that it may not accurately represent the true reflectivity of the Earth but instead represents a coerced alignment of noise or true reflections from other image points. The resulting records can be summed with a weight that is greater for contributions with smaller time shifts and decreases for those with larger shifts, so that the contribution from unreliable parts of the image to the stack is reduced while preserving the reliable parts of the image.

More particularly, buried velocity anomalies that are very rapidly spatially varying are disruptive to seismic images. If one applies time shifts in the imaging condition during migration and leaves the image of each experiment unstacked, they can create a series of spatially and shot-variable time corrections that will improve a migrated image without knowing the correct velocity model. Furthermore, during stacking the data can be weighted in some embodiments so as to reduce unreliable contributions to the stacked image. One way to judge the reliability of a piece of data is by how large a time shift is required to align it with a consensus stacked image. Data requiring a small or zero time shift is considered more reliable and is stacked with a larger weight than data requiring larger time shifts.

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

FIG. 1 illustrates a seismic data processing flow 100 in accordance with one particular aspect of the presently disclosed technique. This processing flow 100 operates on a set of seismic data 110 and a subsurface attribute model 120. The seismic data 110 may be acquired in conventional fashion. The subsurface attribute model 120 may be developed in conventional fashion.

More particularly, the seismic data 110 may be any kind of seismic data known to the art. It may be, for example, data collected from a set of hydrophones (i.e., "hydrophone" or "pressure" data) or from a set of geophones (i.e., "geophone" or "Z" data). The seismic data may also be a combination of hydrophone and geophone data known to the art as multicomponent data. The seismic data may be acquired in a 1D, 2D, 3D, or 4D survey. The survey may be a land-based survey, a marine survey (either towed array or ocean bottom cable survey), or a survey in a transition zone. It may be what is known to the art as a "vertical seismic profile". The type of data and the kind of survey in which it is acquired are immaterial to the practice of the presently disclosed technique.

Similarly, the subsurface attribute model 120 may be any type of subsurface attribute model known to the art. For example, one tool frequently used in the analysis of the seismic data is what is known as a "velocity model". A velocity model is a representation of the geological formation that can be used in analysis. It may be used to, for example, convert the seismic data into one or more "seismic domains" that image the geological formation in different ways. It may also be used in other ways to, for another example, analyze various geophysical characteristics of the formation. Other types of models of the underlying geological formations, collectively called "subsurface attribute models" herein, are also used and implicate similar considerations.

Those in the art having the benefit of this disclosure will also appreciate that the aspect of the presently disclosed technique illustrated in FIG. 1 is computer-implemented. The seismic data 110 and the subsurface attribute model 120 are both sets of ordered, digital data residing in a non-transitory storage medium. The seismic data 110 is ordinarily sufficiently voluminous and the subsurface attribute model 120 sufficiently complex that the computational requirements necessitate the use of an appropriately programmed computing apparatus.

FIG. 2 conceptually depicts selected portions of the hardware and software architecture of a computing apparatus 200 such as may be employed in some aspects of the present invention. The computing apparatus 200 may be a general purpose computing apparatus or a dedicated computing apparatus depending upon the particular implementation. The computing apparatus 200 includes at least a processor 203 communicating with storage 206 over a communication medium 209.

The processor 203 may be any suitable processor or processor set known to the art. Those in the art will appreciate that some types of processors will be preferred in various embodiments depending on familiar implementation-specific details. Factors such as processing power, speed, cost, and power consumption are commonly encountered in the design process and will be highly implementation specific. Because of their ubiquity in the art, such factors will be easily reconciled by those skilled in the art having the benefit of this disclosure. Those in the art having the benefit of this disclosure will therefore appreciate that the processor 203 may theoretically be an electronic microcontroller, an electronic controller, an electronic microprocessor, an electronic processor set, or an appropriately programmed application specific integrated circuit ("ASIC"), field programmable gate array ("FPGA"), or graphical processing units ("GPUs"). Some embodiments may even use some combination of these processor types.

Those in the art will also appreciate that data sets such as the seismic data 110 are quite voluminous and that the processing described herein is computationally intensive. Typical implementations for the processor 203 therefore actually constitute multiple electronic processor sets spread across multiple computing apparatuses working in concert. One such embodiment is discussed below. These considerations affect the implementation of the storage 206 and the communication medium 209 similarly.

The storage 206 may include a magnetic hard disk and/or random access memory ("RAM") and/or removable storage such as a floppy magnetic disk 212 and an optical disk 215. The storage 206 is encoded with a number of software components. These components include an operating system ("OS") 218; an application 221; data structures including the seismic data ("SDATA") 110 and the subsurface attribute model ("SAMOD") 120. The storage 206 may be distributed across multiple computing apparatuses as described above.

As with the processor 203, implementation-specific design constraints may influence the design of the storage 206 in any particular embodiment. For example, as noted above, the disclosed technique operates on voluminous data sets which will typically mitigate for various types of "mass" storage such as a redundant array of independent disks ("RAID"). Other types of mass storage are known to the art and may also be used in addition to or in lieu of a RAID. As with the processor 203, these kinds of factors are commonplace in the design process and those skilled in the art having the benefit of this disclosure will be able to readily balance them in light of their implementation specific design constraints.

The processor 203 operates under the control of the OS 218 and executes the application 221 over the communication medium 209. This process may be initiated automatically, for example upon startup, or upon user command. User command may be directly through a user interface. To that end, the computing system 200 of the illustrated embodiment also employs a user interface 242.

The user interface 242 includes user interface software ("UIS") 245 and a display 240. It may also include peripheral input/output ("I/O") devices such as a keypad or keyboard 250, a mouse 255, or a joystick 260. These will be implementation-specific details that are not germane to the presently disclosed technique. For example, some embodiments may forego peripheral I/O devices if the display 240 includes a touch screen. Accordingly, the presently disclosed technique admits wide variation in this aspect of the computing system 200 and any conventional implementation known to the art may be used.

Furthermore, there is no requirement that the functionality of the computing system 200 described above be implemented as disclosed. For example, the application 221 may be implemented in some other kind of software component, such as a daemon or utility. The functionality of the application 221 need not be aggregated into a single component and may be distributed across two or more components. Similarly, the data structures may be implemented using any suitable data structure known to the art.

As with the processor 203 and the storage 206, the implementation of the communications medium 209 will vary with the implementation. If the computing system 200 is deployed on a single computing apparatus, the communications medium 209 may be, for example, the bus system of that single computing apparatus. Or, if the computing system 200 is implemented across a plurality of networked computing apparatuses, then the communications medium 209 may include a wired or wireless link between the computing apparatuses. Thus, the implementation of the communications medium 209 will be highly dependent on the particular embodiment in ways that will be apparent to those skilled in the art having the benefit of this disclosure.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or, alternatively, implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Returning now to FIG. 1, the processing flow 100 begins by performing (at 130) a wavefield extrapolation. This wavefield extrapolation (at 130) yields a representation of the receiver side wavefield and the source side wavefield. Extrapolation techniques of this type are well known to the art and any suitable wavefield extrapolation technique may be used. One exemplary, suitable wavefield extrapolation technique is the pseudo-analytical method (Etgen and Brandsberg-Dahl, 2010, incorporated by reference below), a time-domain two-way extrapolation technique. However, others including one-way depth-extrapolation techniques such as the F-X method may be used in various embodiments.

The process flow 100 then applies (at 140) the time-shift extended imaging condition to the extrapolated wavefields. This is also known as the time-lag extended imaging condition. One example of this technique is disclosed in P. Sava & S. Fomel, "Time-Shift Imaging Condition in Seismic Migration" 71 Geophysics S209-S217 (2006) ("Sava & Fomel"), incorporated by reference below. Any suitable technique known to the art may be used.

The extended imaging condition generates data at different crosscorrelation lags, either in space or in time, which carries extra information about the subsurface indicating various degrees of velocity inaccuracy as shown in Sava & Fomel, supra, and P. Sava & I. Vasconcelos, "Extended Imaging Conditions for Wave-Equation Migration", 59 Geophysical Prospecting 35-55 (2011) (Sava & Vasconcelos). In conventional processes, this information can be used to drive velocity inversion processes as shown in P. Shen & W. W. Symes, "Automatic Velocity Analysis via Shot Profile Migration", 73 Geophysics VE49-VE59 (2008) (Shen & Symes) and in T. Yang, & P. Sava, "Wave-Equation Migration Velocity Analysis with Time-Shift Imaging", 59 Geophysical Prospecting 635-650 (2011) (Yang & Sava). However, in the presently disclosed technique, it is directly used to identify image degradations and subsequently is employed to improve image quality without updating the migration velocity model. More particularly, the presently disclosed technique alleviates imaging artifacts caused by short wavelength velocity errors.

Figure 3:
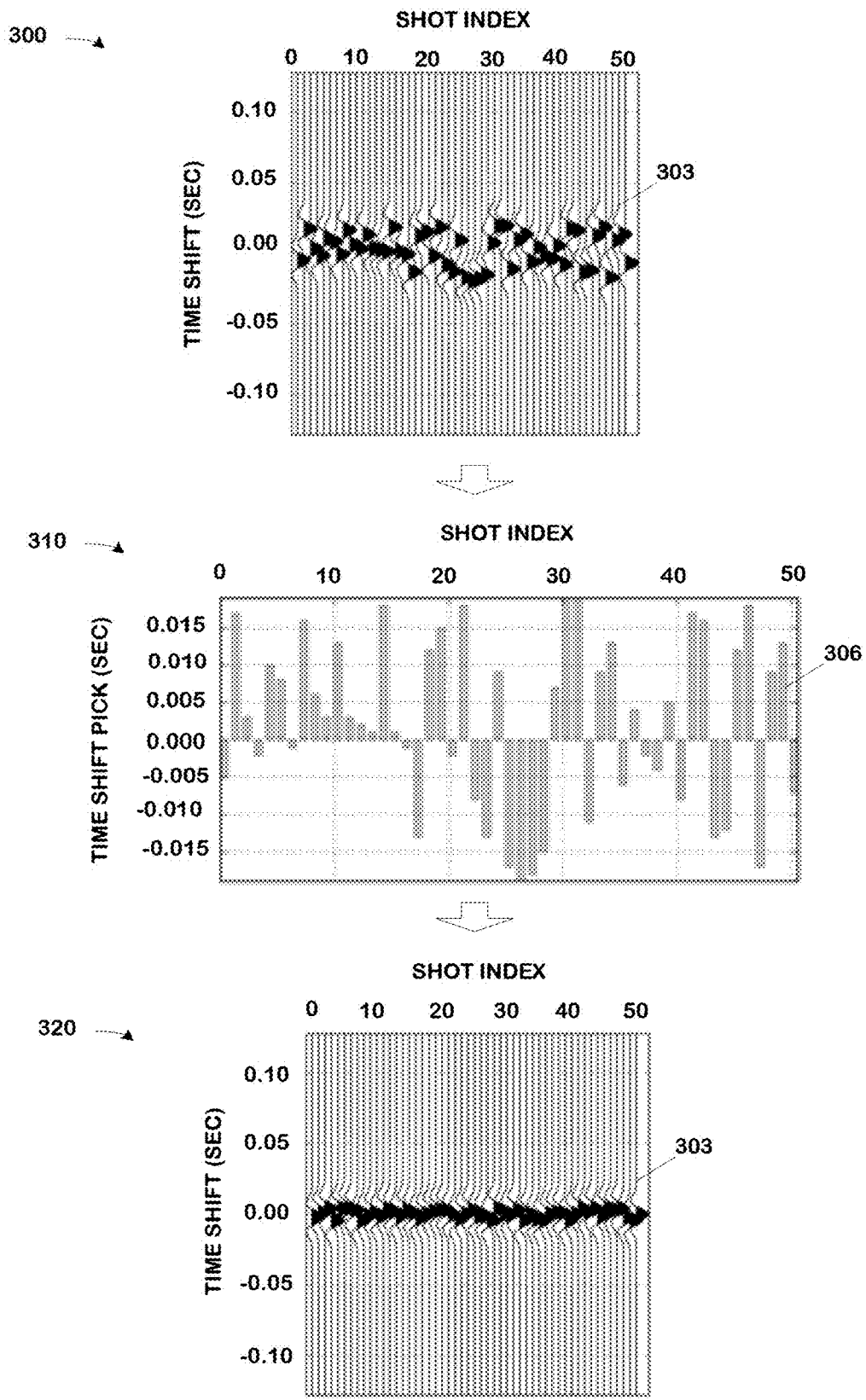
FIG. 3 graphically illustrates the execution of adaptive focusing and the conduct of weighted stacking first discussed relative to FIG. 1.

The process flow 100 then forms (at 150) a shot-indexed, time-lag gather for each image pixel of the subsurface attribute model 120. As those in the art will appreciate, an image pixel in such a model is a discrete node in the model at which the reflectivity is discretized. An exemplary rendering 300 of such a gather at an image pixel using synthetic data is shown in FIG. 3, which illustrates the efficacy of the adaptive focusing technique disclosed herein. Note the lack of flatness amongst the traces in the gather 303 in this rendering 300. The shot-indexed, time-lag gather 303, only one of which is indicated, in the rendering 300 may be determined using conventional techniques known to the art.

Conventionally the lags are calculated at discrete time steps of $\Delta\tau$. The quantity $L \, \Delta\tau$, where L is the integer lag, then is a time shift with units of time, as shown in the vertical axis in rendering 300. A lag of zero conventionally corresponds to a standard (non-extended) imaging condition. The time-shift extended imaging condition increases the dimensionality of the image by calculating an image value at each of a range of lags between the extrapolated source and receiver wavefields, thus generating an image at each depth point both as a function of shot index and lag, as shown in gather 303.

The process flow 100 then adaptively focuses (at 160) each gather, e.g., the shot-indexed, time-shift gather 303 in FIG. 3. The adaptive focusing (at 160) for the illustrated embodiment is shown in FIG. 4. It begins by picking (at 400) a respective optimal time lag for each of the traces in the gather.

Ideally the optimal time lag would measure the time offset between a trace in an extended-image gather calculated in the given velocity model (120) versus the same trace calculated the same way but using the true velocity model. As the true velocity model is only known in synthetic models, not in the real Earth, the given velocity model can only be an approximation for non-synthetic data, and the optimal time lag can only be estimated. When we pick an optimal time lag, we are calculating our best estimate of the time shift caused by the inaccuracies and limitations of our given velocity model.

There are many ways of doing this known to the art. For example, the lag containing the peak amplitude could be picked for each trace in the gather. In this particular embodiment, the traces in the gather are stacked to create a consensus trace, and then the lag corresponding to the peak cross correlation between each trace in the gather and the consensus trace is picked as the lag that best measures the time shift of each trace with respect to the consensus.

Note that the time shifts 306, only one of which is indicated, may vary without discernible pattern within a gather, as shown in the rendering 310 in FIG. 3. Many variations will be apparent to those skilled in the art. A weighted sum or median stack could be used to create the consensus trace. The traces could be interpolated to allow a non-integer lag to be determined. The consensus trace could be low-pass filtered or otherwise processed. In any case, the optimal lag for each trace is multiplied by $\Delta\tau$ to determine the corresponding time-shift that optimally aligns each trace in the gather with the consensus trace.

These time shifts are then applied (at 410) to the gathers. The rendering 320 in FIG. 3 illustrates the application of the time shifts 306 shown in the rendering 310 to the gather 303 of the rendering 300. Note how the application of the time shifts 306 flattens the traces in the gather 303 in the rendering 320 and moves the peak energy in each trace to near the central time shift of zero.

This particular embodiment is designed to also suppress noise in the seismic record. A significantly large time shift 306 will generally be presumed to indicate that the respective trace of the corresponding gather 303 is more likely to be untrustworthy, because the large time shift indicates that there are inconsistencies in the velocity model used to migrate that trace. Significantly large time shifts 306 can therefore be used to identify parts of the common-depth-point gather that are more likely to be erroneous. Accordingly, as shown in FIG. 4, the adaptive focusing (at 160) in this particular embodiment includes an optional weighting (at 420) for each of the traces in gather 303. This weighting is then used in stacking the gathers as described further below.

The weighting may vary greatly across various implementations of this particular embodiment. The weighting may be as simple as a "1" or a "0" indicating whether to include or omit the particular trace from the stacking. Alternatively, the weighting may be inversely proportional to the magnitude of the time lag added to a constant (so that the weight at zero lag does not become infinite). Or the weighting may be arrived at through the application of some mathematical function that is largest at zero lag and decreases for lags of larger magnitude. The weighting function will be data dependent and should act to increase the weight of reliable traces and decrease the weight of unreliable traces. The weighting may also be omitted altogether in some embodiments.

Note that these weights may be output as an auxiliary data product useful for interpretation, indicating which parts of the image the human interpreter may rely on and which should be treated with suspicion. The full volume of weights may have more dimensions than are easily interpretable, and thus the interpreter may choose to instead consult a volume that has been projected to reduce its number of dimensions. Many ways of doing this are known to the art. For example, the average or median weight applied to the traces making up each common-depth-point gather might be output at each common depth point. This projected volume would have the same dimensionality as the stacked image.

What constitutes a "significant" or "large" time lag will be a consideration of implementation-specific factors such as will become apparent to those skilled in the art having the benefit of this disclosure. Exemplary factors include the type of imaging to be performed, the purpose for which the image will be used, the deviation of the time lag magnitudes, and the overall level of noise in the seismic record. Not all of these considerations will be used in each embodiment. Indeed, some embodiments may omit these considerations entirely and/or use others in lieu or in addition to these. The list is merely exemplary and is not exhaustive.

Returning now to FIG. 1, the adaptive focusing (at 160) is followed by a stacking (at 170) of the adaptively focused gathers. This particular embodiment weights the gathers during the adaptive focusing, see FIG. 4, and so this is a weighted stacking in this embodiment. (It follows that, in embodiments that omit the weighting during the adaptive focusing, the stacking here may be unweighted.) As discussed above, the gathers are weighted differently depending on the amount of error they are estimated to contain. High error (i.e., large time lag) gathers consequently are either omitted or de-emphasized. In this way, this particular embodiment mitigates errors in the image. Conventional stacking techniques may be used to perform this stacking.

FIG. 5A-FIG. 5B illustrate the effect of the adaptive focusing as described above on the gather 303 first shown in the rendering 300 in FIG. 3. More particularly, FIG. 5A depicts a stack of the gather of traces 303 without the adaptive focusing taught above. FIG. 5B depicts a stack of those same traces 303 stacked after application of the adaptive focusing technique, yielding a time-shift trace that has a strong amplitude at time zero, which will be extracted as the image at this particular location. FIG. 5A, in comparison, has less energy at time zero due to time shifting of the reflection energy in the shot-indexed traces away from time zero, caused by inaccuracies in the velocity model above this image point.

The stacked, adaptively focused gathers are then used to image (at 180) the subterranean formation of which the seismic data is representative. Those in the art having the benefit of this disclosure will appreciate that there are many ways in which stacked gathers may be used to image. The stacked, adaptively focused gathers generated as disclosed above may be used in any conventional imaging process in the same manner as stacked gathers that have not been adaptively focused. That is, the type and manner of the imaging is not material to the practice of the technique.

Thus, the presently disclosed technique applies the extended imaging condition and the adaptive focusing to identify and mitigate image degradations, especially those arising from short wavelength velocity errors, while relying on velocity estimation tools to accurately provide the long and intermediate wavelength components of a subsurface attribute or velocity model (such as at 120). One positive consequence of this technique, then, is that it can improve image quality without requiring an update of the migration velocity model. Still other advantages, uses, and benefits will become apparent to those skilled in the art having the benefit of this disclosure.

Those in the art will appreciate that the adaptive focusing technique disclosed above is a part of a larger process. This larger process stretches from acquisition of the seismic data 110 through its pre-processing and processing to the analysis, including the adaptive focusing, of the processed data. To further an understanding of the presently disclosed technique, this larger process will now be disclosed in one particular embodiment. However, in the discussion below, synthetic data rather than real world data is used.

Figure 6:
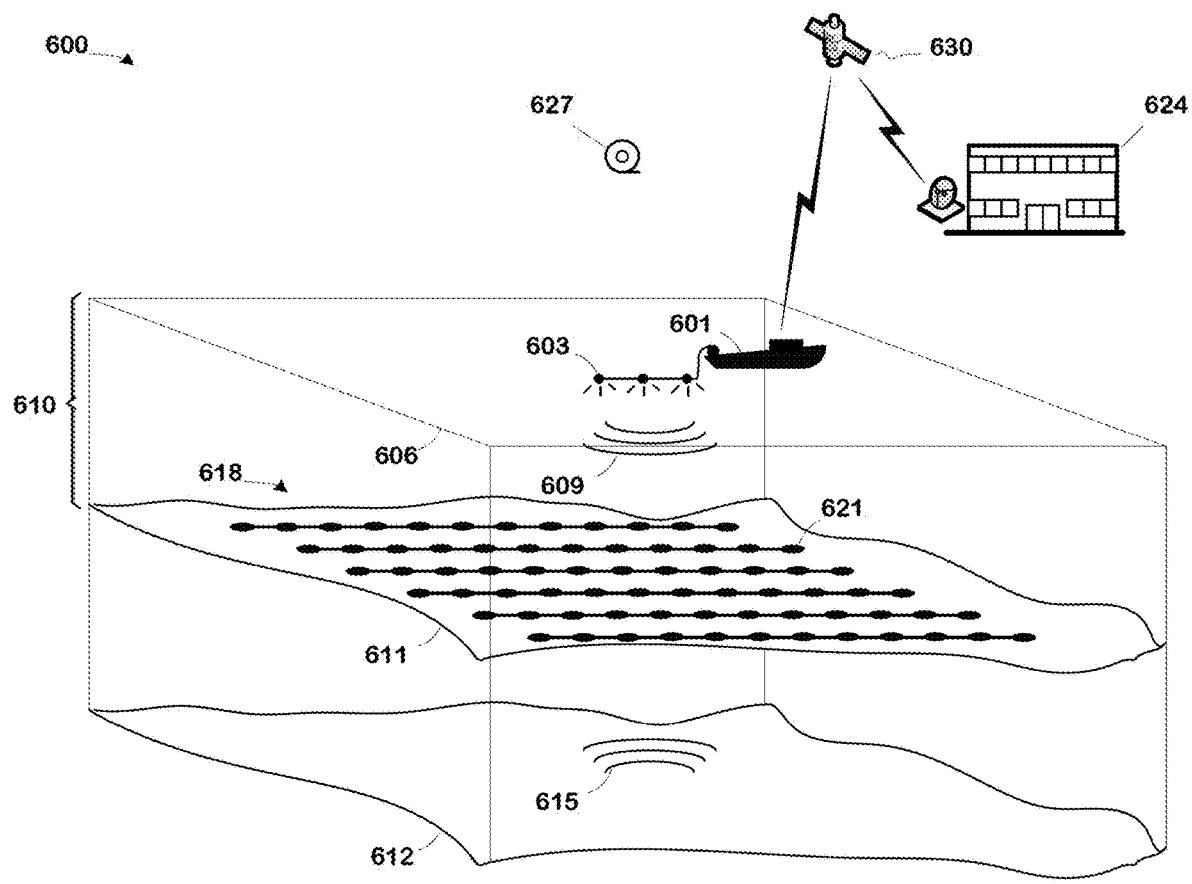
FIG. 6 conceptually depicts the acquisition of the seismic data set in one particular embodiment.

Referring now to FIG. 6, the acquisition 600 is performed in a conventional ocean bottom survey in this particular case. A tow vessel 601 tows one or more conventional sources 603 that may be, for example, airguns or swept-frequency sources such as are known in the art, on the water's surface 606. The source(s) 603 impart one or more seismic signals 609 into the water column 610 to penetrate the seabed 611 and where they are reflected by a subterranean reflector 612.

The reflections 615 then propagate back to the receiver array 618 on the seabed 611. The receiver array 618 includes a plurality of receivers 621 (only one indicated). The receivers 621 themselves could be hydrophones, geophones, or multicomponent nodes depending on the implementation. The reflections 615 are detected by the receivers 621 and recorded as the seismic data 110. The recorded seismic data 110 are then communicated to a computing facility 624. This communication may be, for example, by hard copy on a magnetic tape 627 or by transmission via a satellite 630. The computing facility 624 houses a computing system by which the seismic data 110 are processed as described.

Figure 7:
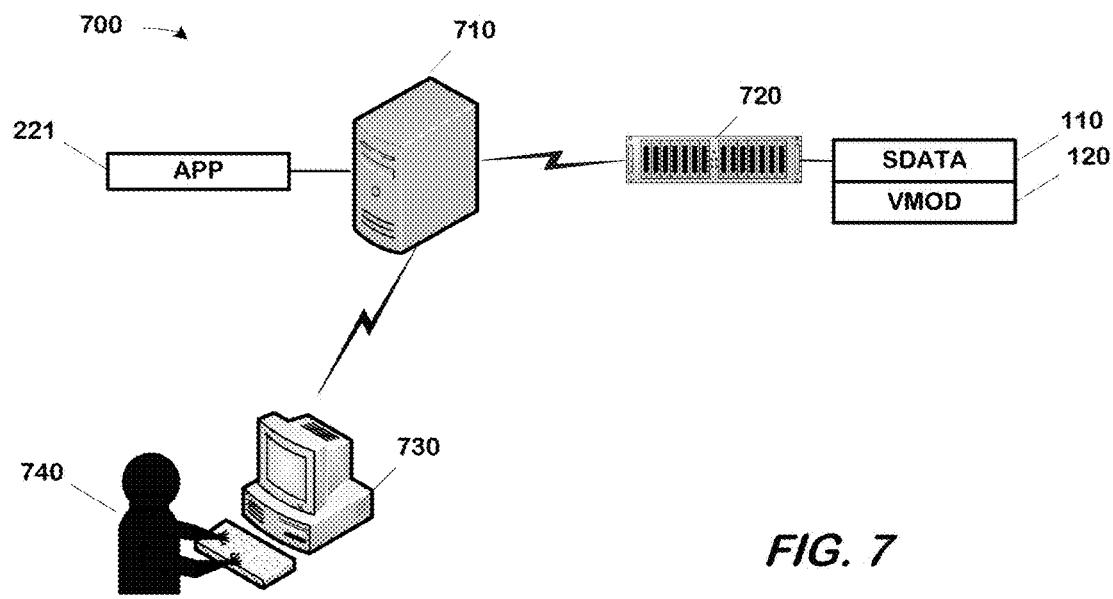
FIG. 7 illustrates one particular embodiment of the computing apparatus of FIG. 2 as used in the embodiment of FIG. 6 and which is, more particularly, a computing system on which some aspects of the present invention may be practiced in some embodiments.

A portion of an exemplary computing system 700 by which such processing occurs in this embodiment is shown in FIG. 7. The computing system 700 is networked, but there is no requirement that the computing system 700 be networked. Alternative embodiments may employ, for instance, a peer-to-peer architecture or some hybrid of a peer-to-peer and client/server architecture. The size and geographic scope of the computing system 700 is not material to the practice of the invention. The size and scope may range anywhere from just a few machines of a Local Area Network ("LAN") located in the same room to many hundreds or thousands of machines globally distributed in an enterprise computing system.

The computing system 700 comprises, in the illustrated portion, a server 710, a mass storage device 720, and a workstation 730. Each of these components may be implemented in their hardware in conventional fashion. Alternative embodiments may also vary in the computing apparatuses used to implement the computing system 700. Those in the art will furthermore appreciate that the computing system 700, and even that portion of it that is shown, will be much more complex. However, such detail is conventional and shall not be shown or discussed to avoid obscuring the subject matter claimed below.

In FIG. 7, the application 221 is shown residing on the server 710 while the seismic data 110 and subsurface attribute model 120 reside in the mass storage 720. While this is one way to locate the various software components, the technique is not dependent upon such an arrangement. Although performance concerns may mitigate for certain locations in particular embodiments, the situs of the software components is otherwise immaterial.

The seismic data 110, in this particular embodiment, is multicomponent OBC data including both hydrophone and geophone data. The processing of the seismic data 110 customarily begins with a variety of pre-processing steps known to those of ordinary skill in the art such as conversion of data formats, time windowing, discarding noisy traces, associating navigation information with each data trace, removing the source signature, deconvolution, muting, etc.

The process flow 100 of FIG. 1 is then implemented in an adaptive image focusing, automated workflow that, in this particular embodiment, extracts improved imaging results from imperfect migration velocity models. It involves amplitude balancing and alignment to directly construct improved gathers and noise suppression to remove destructive energy from the stack. This particular embodiment also employs the weighted gathering of the adaptively focused wavefields disclosed above to identify and suppress non-contributing shot-record migration results in the time-lag extended image domain.

The process applies the extended imaging condition (at 140) to the wavefields extrapolated (at 130) from the seismic data 110 and the subsurface attribute model 120. The subsurface attribute model 120 is, in this particular embodiment, a velocity model. As noted above, the extended imaging condition generates data at different crosscorrelation lags, either in space or in time, which carry extra information of the subsurface indicating various degrees of velocity inaccuracy. Sava & Fomel define the extended imaging condition as:

$$I(x, s, \tau) = \sum_{\omega} D^*(x, s, \omega) U(x, s, \omega) e^{i\omega\tau} \qquad (1)$$

where I represents the extended image at time lag $\tau$ for shot s, and D and U are the source and receiver wavefield, respectively. The corresponding time domain formula can be expressed as:

$$I(x, s, \tau) = \sum_{t} D^*\left(x, s, t - \frac{\tau}{2}\right) U\left(x, s, t + \frac{\tau}{2}\right) \qquad (2)$$

The conventional image corresponds to a stack over shots at zero time lag, i.e., $$I_0(x) = \sum_{s} I(x, s \cdot \tau = 0) \qquad (3)$$

This indiscriminate summation of conventional imaging in equation 3 does not take into account the high variability of contributions from individual shots in the subsalt environment due to velocity uncertainties. To obtain auto-focused images, the technique starts from the individual extended-image shot-migration results of equations 1 or 2. It then searches for optimized stacking lags and weights in the extended image domain.

The extrapolated wavefield exhibits a frequency-dependent sensitivity to the migration model. The low frequency component is relatively less sensitive to short wavelength velocity errors and thus more reliably reveals the subsurface structure. For this reason, one may use the low frequency response as a guide to improve image quality at higher frequencies. A low frequency image can be constructed using frequency-domain migration codes through selective summation over low frequencies in Equation 1. This frequency-domain methodology does not incur any significant extra computations in the migration. In comparison, time-domain codes seem to require a separate migration run to obtain the low-frequency response. However, this is in fact unnecessary because one can extract the required low-frequency information from the extended images.

Figure 8:
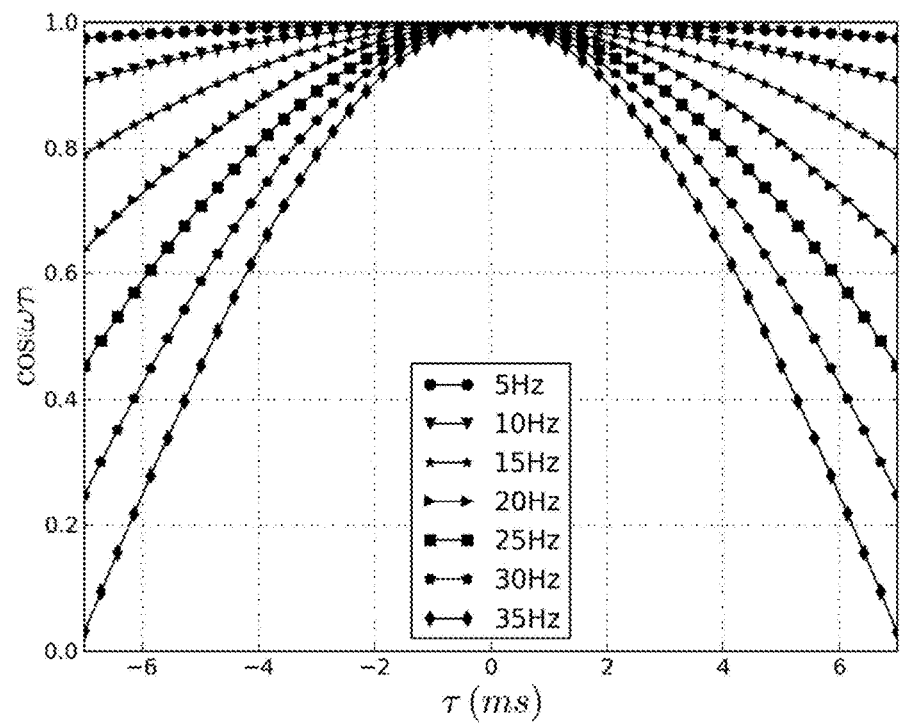
FIG. 8 graphs the variation of the weighting function cos(ωτ) in Equation 4 with time lag at different frequencies.

One possibility is to sum two extended images with opposite time lags as follows:

$$I_{\tau_{LF}}(x, s) = \qquad (4)$$
$$I(x, s, \tau_{LF}) + I(x, s, -\tau_{LF}) = 2 \sum_{\omega} D^*(x, s, \omega) U(x, s, \omega) \cos\omega\tau_{LF}$$

which essentially yields a low-pass-filtered image, because as shown in equation 4 the effect of the summation is to weight the image at frequency $\omega$ by $\cos \omega\tau_{LF}$. The choice of time shift $\tau_{LF}$ depends on the desired frequency content, as is illustrated in FIG. 8, which shows the relationship between $\tau_{LF}$ and the weighting term $\cos \omega\tau_{LF}$ for various frequencies.

The similarity of the extended image $I(x,s,\tau)$ and the low-frequency image $I_{\tau_{LF}}(x,s)$ is measured for a range of trial time lags $\tau$, and the time lag $\tau(x,s)$ where the maximum similarity is located for each subsurface location x and shot index s is then recorded. Non-zero time lags indicate velocity errors have caused certain distortions to the zero-lag image. Reflection energy shifted away from time zero does not contribute in conventional stacking (Equation 3) because only energy at lag of zero is included in the final stacked image. By using the calculated time shifts to first correct the time (410), the misplaced energy contributes to the final stack.

An improved image can then be obtained through weighted stacking over shots, $$I_w(x, s) = \sum_{s} I(x, s) w(x, s) \qquad (5)$$

a procedure similar to the optimal stacking M. Vyas & A. Sharma, 2012, "Optimal stacking", 82nd Annual Meeting, SEG, Expanded Abstracts, 1-5 (2012) (Vyas & Sharma). One choice of weighting function is $$w(x, s) \propto \frac{1}{[|\tau_i(x, s)| + 1]^2}.$$

A similarity matching procedure for seismic data will contain some uncertainty. Some ambiguities in the time-lag picking process will therefore remain. One solution is to perform a further stacking of the images from different time lag picks:

$$I(x) = \sum_w I_w(x) \qquad (6)$$

This works well if the time-lag picking errors are random, which one could achieve by using different similarity matching algorithms or intentionally introducing proper randomness into the selected similarity matching method.

Figure 9:
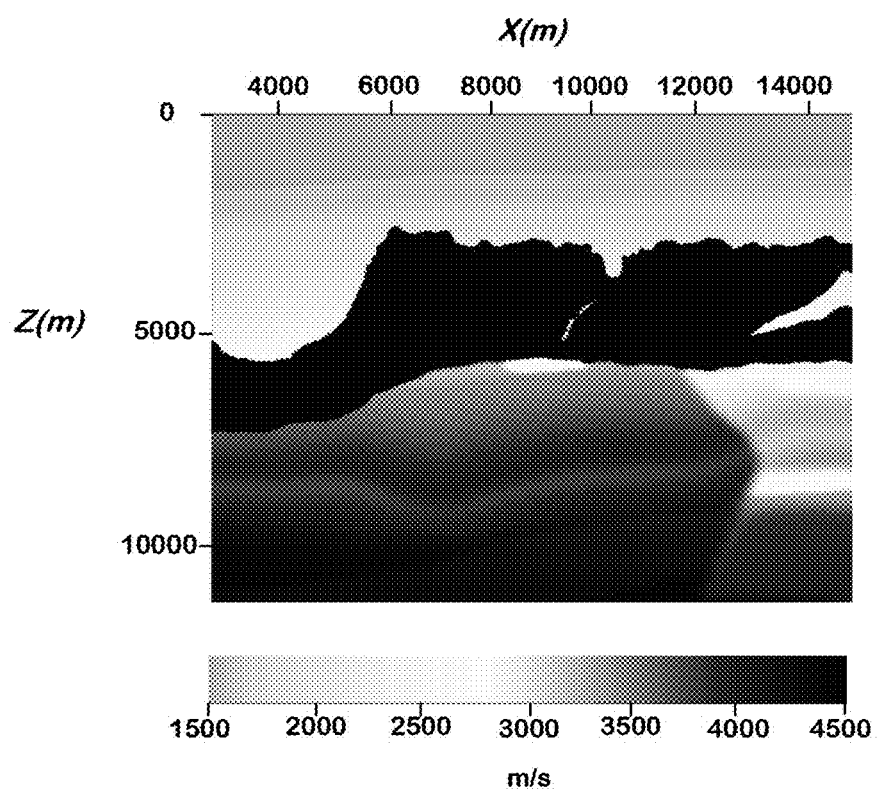
FIG. 9 is a rendering of a true velocity model.
Figure 10:
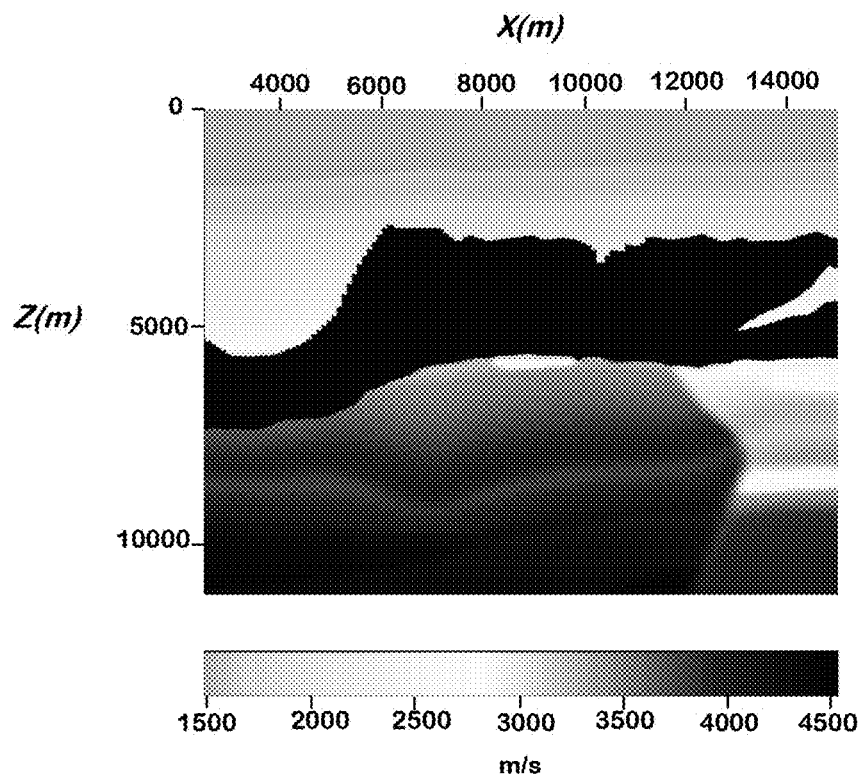
FIG. 10 is a rendering of a migration velocity model.
Figure 11:
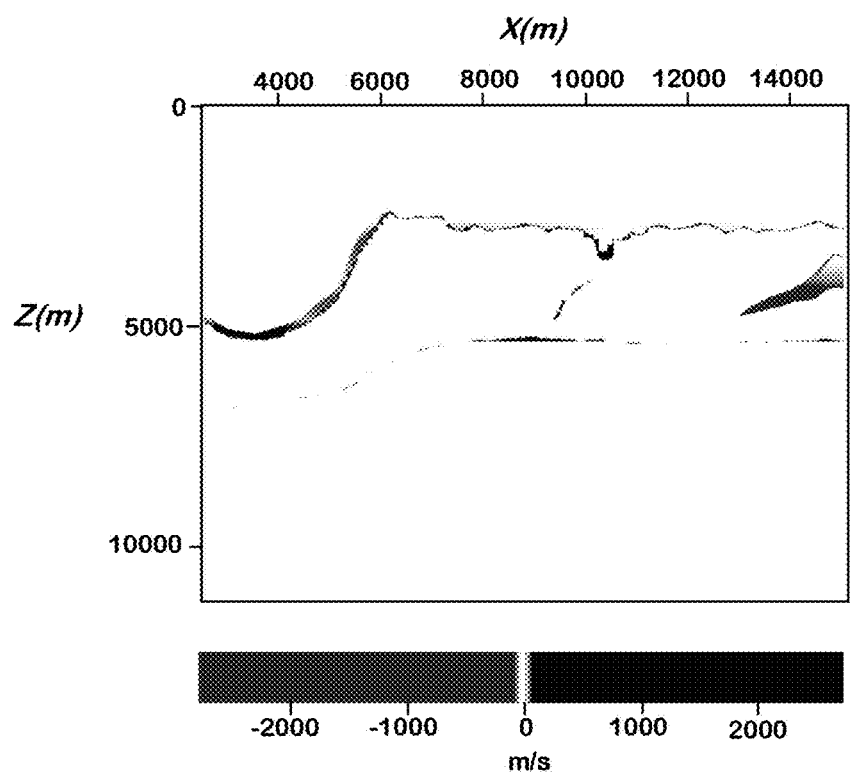
FIG. 11 is a rendering of the difference between the migration velocity model shown in FIG. 10 and the true model shown in FIG. 9.

FIG. 9 displays part of the benchmark model published in Billette, F. & S. Brandsberg-Dahl, "The 2004 BP velocity benchmark: 67th Annual Conference and Exhibition", EAGE, Extended Abstracts, B305 (2005) that will be used in this illustration of how the velocity errors around the salt body would affect the image quality. The illustration actually uses a slightly modified version of the original model as the migration velocity model. The modified model is shown in FIG. 10. The difference between this modified model and the original model is shown in FIG. 11. This difference is representative of the sorts of errors that happen in practice when velocity models are constructed to represent the true velocity structure of the Earth. In particular, these errors commonly occur when analyzing data from the Gulf of Mexico. Determining the fine details of the structure of the top and bottom of salt is an unsolved challenge.

Figure 12:
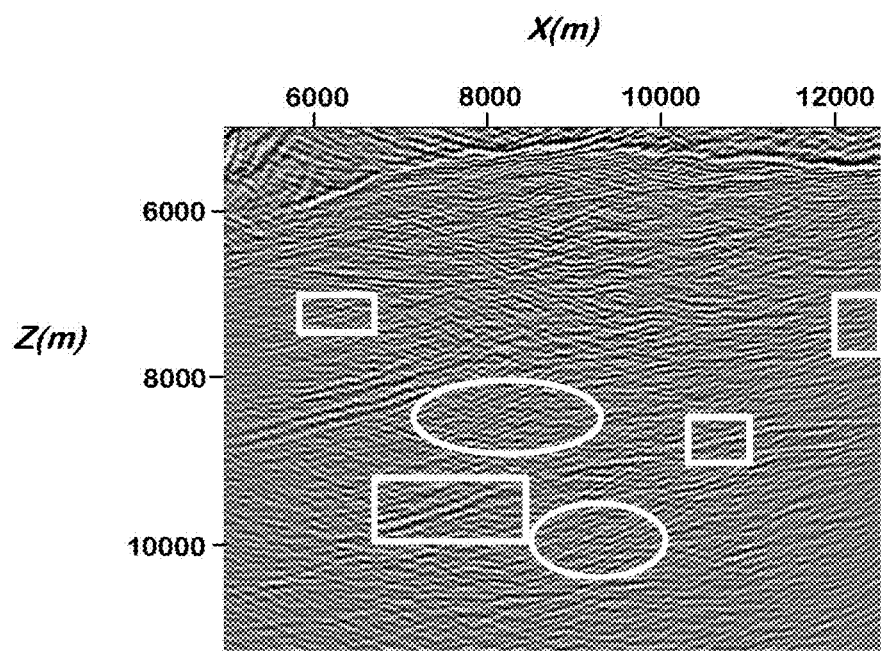
FIG. 12 is a rendering of a conventional image produced with the migration velocity model shown in FIG. 10 over the frequency band of 3-6-30-35 Hz.
Figure 13:
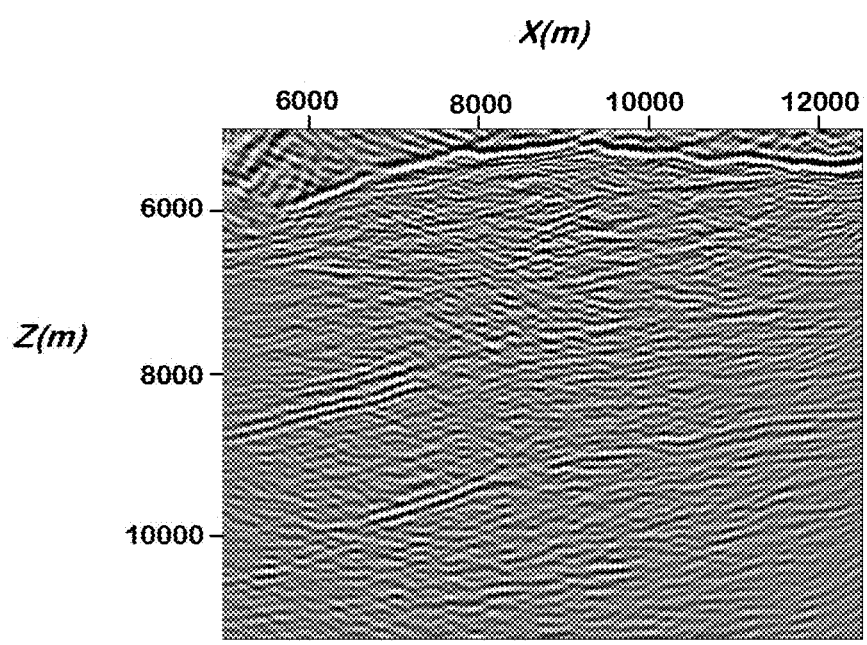
FIG. 13 is a rendering of a conventional image produced with the migration velocity model shown in FIG. 10 over the frequency band of 3-6-20-25 Hz.

A full-frequency wave-equation migration result, i.e. a conventional stacked image, for the sub-salt area is given in FIG. 12. Due to inaccuracies in the migration velocity model, this image contains a significant amount of artifacts. Low frequency data are less sensitive to the velocity inaccuracies, as is demonstrated in FIG. 13, a low-frequency migrated image corresponding to the same image shown in FIG. 12. FIG. 13 lacks the resolution exhibited in FIG. 12 but appears cleaner and better focused. A similar low frequency image can also be extracted from the time-lag data, as explained by Equation 4. An example is given in FIG. 14, which was produced by summing the two time-lag images at τ=8 ms and τ=−8 ms.

Figure 14:
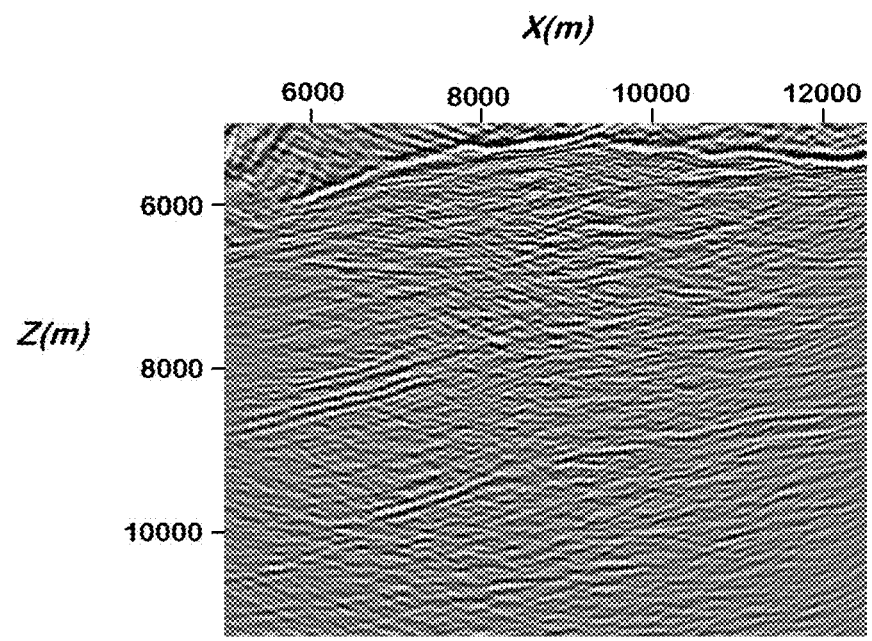
FIG. 14 a rendering of an exemplary low frequency image extracted from the time-lag data by summing the two time-lag images at τ=±8 ms.

Examination of the artifacts reveals that FIG. 13 is slightly better than FIG. 14 but the two figures for practical purposes are the same. The presently disclosed technique uses time-lag images to construct the low-frequency responses as this approach has a significant cost benefit for time-domain migrations. Such low-frequency images from each shot will be used in the search for optimal time lags to focus the image (400). Ideally, "optimal time lags" are those that, when used to time shift unstacked extended-image gathers, would result in the energy in the traces moving to where it would have been if the velocity model above that image point had been correct. For real data, we do not know the true velocity model, and optimal time lags can at best only be estimated by comparing extended images of the same common image point from different shots.

Figure 15:
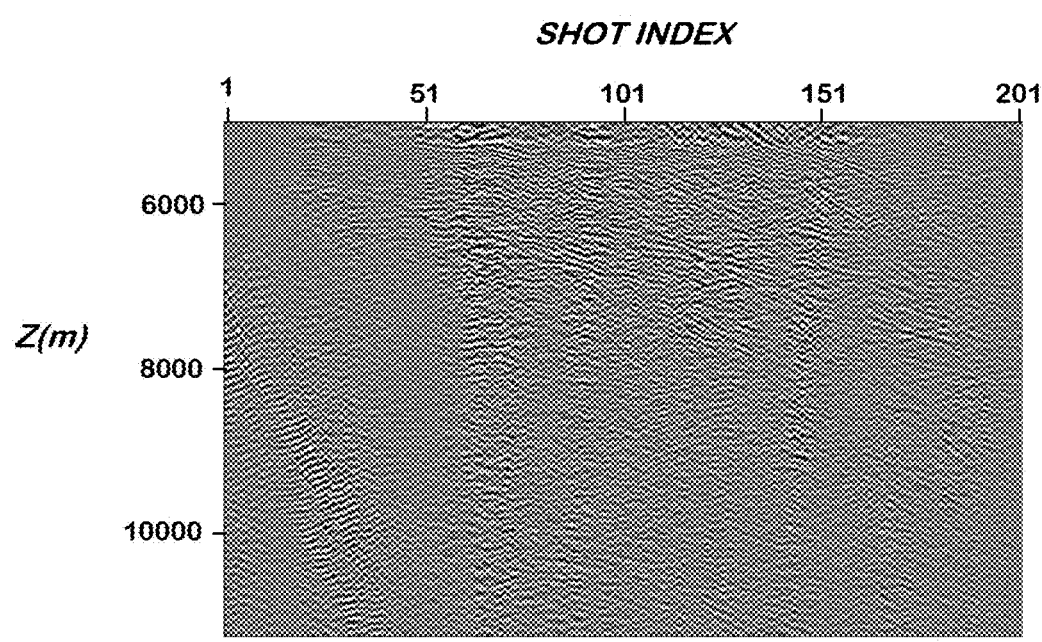
FIG. 15 is a rendering of a shot-indexed gather at x=8750 m for a range of depths located below salt.
Figure 16:
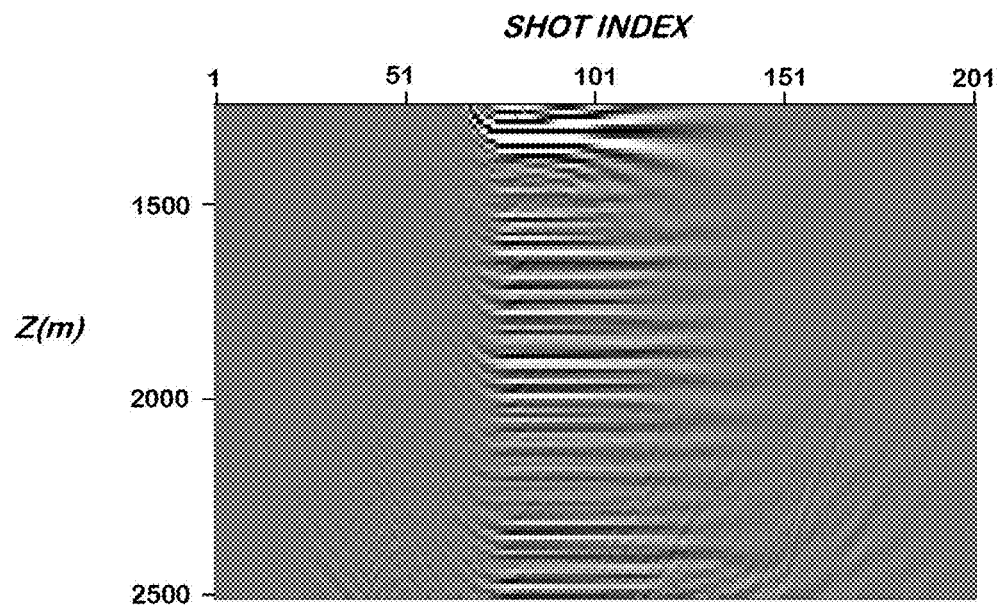
FIG. 16 is a rendering of a shot-indexed gather at x=8750 m for a range of depths located above salt.
Figure 17:
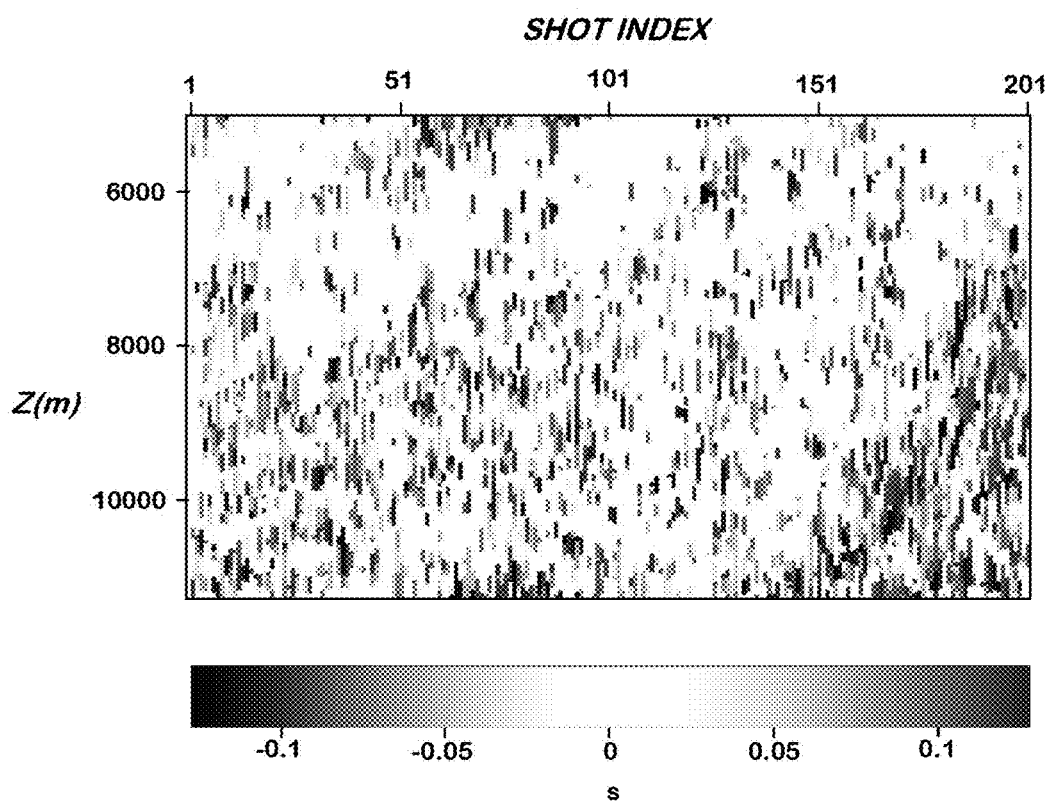
FIG. 17 is a rendering of the time lag picks at x=8750 m for the range of depths shown in FIG. 15.

The artifacts can also be observed in the unstacked shot-indexed gather in FIG. 15. (I.e., if we stack FIG. 15 over the horizontal shot index axis, we would create one vertical trace in FIG. 12.) If the velocity model were accurate, we would expect to create a similar image from each shot, and the figure would show horizontal stripes. By comparing FIG. 15 to the unstacked shot-indexed gather for a range of depths in the sediments above the salt, shown in FIG. 16, which does show the expected horizontal stripes, we can see that the velocity errors around the salt body caused substantial distortions to the sub-salt gather in FIG. 15. The interest is to differentiate signal from noise using these gathers by adaptively quantifying the similarity between the time-lag images and the low frequency image, also extracted from the time-lag data. An example of the magnitude of the time-lag picks corresponding to the maximum similarity for each depth and shot at this horizontal position in this 2D model is shown in FIG. 17.

Figure 18:
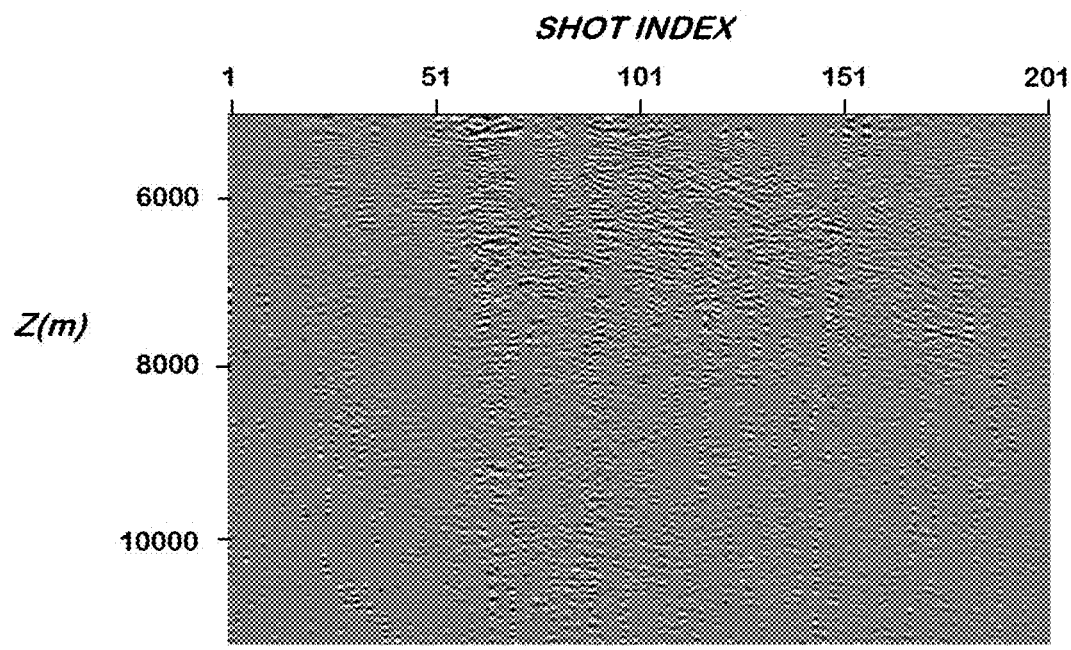
FIG. 18 is a rendering of a weighted shot-indexed gather at x=8750 m for the range of depths shown in FIG. 15.

Large time lags in general coincide with seemingly destructive energies on the corresponding shot-index gather shown in FIG. 15. This particular embodiment then applies a weighting derived from the time lag picks to the shot-indexed gathers. FIG. 18 shows the results of applying these weights to the shot-indexed gather in FIG. 15. Unreliable portions of the gather have been weighted down. A stack of the weighted shot-indexed gathers produces an improved image with the major events being notably enhanced and the artifacts being significantly suppressed.

As will be clear to those of ordinary skill in the art, this process of creating an improved image can be iterated. The weighted stack then becomes the new consensus image, and new time shifts and weights can be calculated by comparing extended-image gathers to consensus traces taken from the new consensus image. This process of calculating optimal time shifts, stacking, and filtering to create a low frequency filtered image (or summing two or more time lags to create a low frequency image as in FIG. 14) may be repeated until convergence or as desired. As the stacked image quality improves with each iteration, the maximum frequency allowed in the low-frequency consensus traces may be increased.

Figure 19:
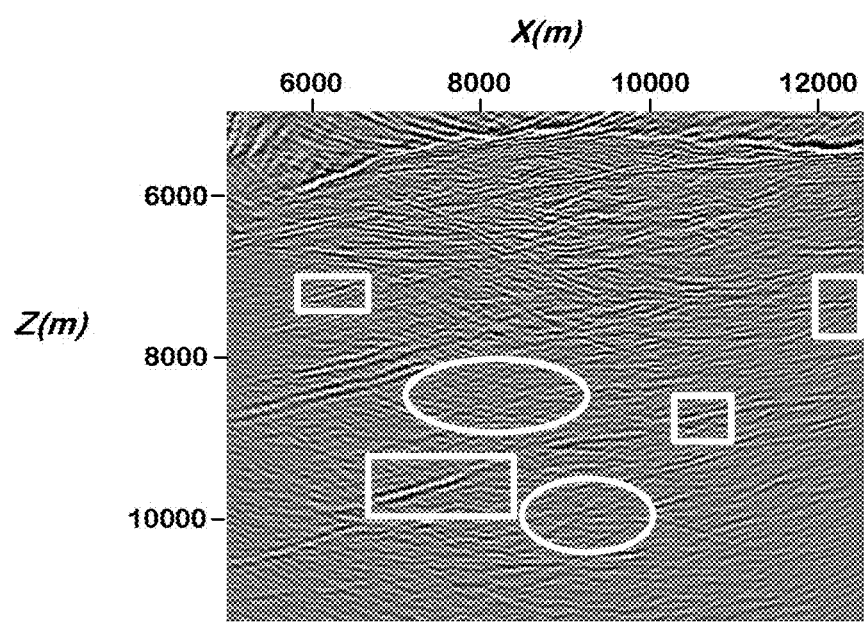
FIG. 19 is a rendering of an adaptively focused image, showing the same subsurface image points as in FIG. 12.

In particular, at each common depth point the degree of low-pass filtering may be varied depending on the consensus reliability of the extended-image gather traces being stacked there, such that the bandwidth of the image naturally increases the more reliable the image. FIG. 19 shows the result of such an iterated image improvement. Comparing FIG. 19 with FIG. 12, we can see that it has enhanced the image without sacrificing resolution, as in FIGS. 13 and 14.

The extended imaging condition provides the opportunity to detect the velocity errors and it may also be used to at least partially compensate for these errors to improve the image quality, which can be realized through similarity matching and weighted stacking as we have demonstrated using time-lag images for a synthetic dataset. This approach is fully automated and is completely data driven. The shot-indexed gather is a good choice for shot-record migrations. Those of ordinary skill in the art will readily appreciate that other types of gathers can certainly be employed using the method of this invention.

The following patents, applications, papers, etc. are hereby incorporated by reference for the purposes noted:

Etgen, J. T., and Brandsberg-Dahl, S., "Pseudo-analytical method for the solution of wave equations", U.S. application Ser. No. 12/574,529, filed Oct. 6, 2009, and published Apr. 8, 2010, as US Patent Publication 2010/0088035 (2010), for its teachings regarding methods for extrapolating wavefields in time.

Sava, P., and S. Fomel, "Time-Shift Imaging Condition in Seismic Migration" 71 Geophysics S209-S217 (2006), for its teachings regarding the time-shift extended imaging condition.

M. Vyas & A. Sharma, "Optimal Stacking", 82nd Annual Meeting, SEG, Expanded Abstracts, 1-5 (2012), for its teachings regarding the stacking of gathers.

To the extent any incorporated patent, application, paper, etc. conflicts with the disclosure herein, the present disclosure controls.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for use in seismic exploration, comprising:
accessing a set of seismic data representative of a subterranean geological formation and a subsurface attribute model of the subterranean geological formation;
performing a wavefield extrapolation on the seismic data in the subsurface attribute model;
applying a time-shift extended imaging condition to the extrapolated wavefields;
forming shot-indexed, time shift gathers for each image pixel of the subsurface attribute model from the conditioned extrapolated wavefields;
adaptively focusing the gathers using a processor, the adaptive focusing comprising determining for each trace in the gather the amount of time shift to apply to yield a zero time lag for that trace and applying the determined time shift to each respective trace;
stacking the adaptively focused gathers using the processor; and
imaging the subterranean geological formation from the stacked, adaptively focused gathers using the processor.

2. The method of claim 1, wherein executing the adaptive focusing further comprises weighting each trace by a weight that is a decreasing function of a magnitude of a determined time shift for a given trace.

3. The method of claim 2, wherein the weighting function is:

$$w(x, s) \propto \frac{1}{[|\tau_i(x, s)| + 1]^2}$$

wherein
x is the spatial coordinate;
s is the shot index; and
τ is the determined time shift for the given trace.

4. The method of claim 1, wherein executing the adaptive focusing further comprises weighting each trace by a weight that is a decreasing function of the magnitude of a magnitude of a determined time shift for a given trace.

5. The method of claim 4, wherein the weighting function is:

$$w(x, s) \propto \frac{1}{[|\tau_i(x, s)| + 1]^2}$$

wherein:
x is the spatial coordinate;
s is the shot index; and
τ is the determined time shift for the given trace.

6. The method of claim 1, wherein determining for each trace in the gather the amount of time shift includes:
determining the amount of the time shifts from a plurality of low frequency ended images; and
assigning those low frequency time shifts to the respective traces.

7. The method of claim 1, wherein adaptively focusing the gathers includes iteratively adaptively focusing the gathers before stacking.

8. A computing apparatus programmed to perform a method for use in seismic exploration, the computing apparatus comprising: a processor; bus system; a storage; and a software component residing on the storage that, when invoked by the processor over the bus system, performs a method comprising:
accessing a set of seismic data representative of a subterranean geological formation and, a subsurface attribute model of the subterranean geological formation;
performing a wavefield extrapolation on the seismic data in the subsurface attribute model;
applying a time-shift extended imaging condition to the extrapolated wavefields;
forming shot-indexed, time shift gathers for each image pixel of the subsurface attribute model from the conditioned extrapolated wavefields;
adaptively focusing the gathers;
stacking the adaptively focused gathers; and
imaging the subterranean geological formation from the stacked, adaptively focused gathers.

9. The computing apparatus of claim 8, wherein executing the adaptive focusing comprises: determining for each trace in the gather the amount of time shift to apply to yield a zero time lag for that trace; and applying the determined time shift to each respective trace.

10. The computing apparatus of claim 8, wherein executing the adaptive focusing further comprises weighting each trace by a weight that is a decreasing function, of a magnitude of a determined time shift for a given trace.

11. The computing apparatus of claim 10, wherein the weighting function is:

$$w(x, s) \propto \frac{1}{[|\tau_i(x, s)| + 1]^2}$$

wherein:
x is the spatial coordinate;
s is the shot index; and
τ is the determined time shift for the given trace.

12. The computing apparatus of claim 9, wherein determining for each trace in the gather the amount of time shift includes:
determining the amount of the time shifts from a plurality of low frequency extended images; and
assigning those low frequency time shifts to the respective traces.

13. The computing apparatus of claim 8, wherein adaptively focusing the gathers includes iteratively adaptively focusing the gathers before stacking.

14. A non-transitory program storage medium encoded with instructions that, when executed by a processor, perform a method for use in seismic exploration, the method comprising:
accessing a set of seismic data representative of a subterranean geological formation and a subsurface attribute model of the subterranean geological formation;
performing a wavefield extrapolation on the seismic data in the subsurface attribute model;
applying a time-shift extended imaging condition to the extrapolated wavefields;

forming shot-indexed, time shift gathers for each image pixel of the subsurface attribute model from the conditioned extrapolated wavefields;

adaptively focusing the gathers;

stacking the adaptively focused gathers; and imaging the subterranean geological formation from the stacked, adaptively focused gathers.

15. The program storage medium of claim 14, wherein executing the adaptive focusing comprises:

determining for each trace in the gather the amount of time shift to apply to yield a zero time lag for that trace; and applying the determined time shift to each respective trace.

16. The program storage medium of claim 15, wherein executing the adaptive focusing further comprises weighting each trace by a weight that is a decreasing function of the magnitude of a magnitude of a determined time shift for a given trace.

17. The program storage medium of claim 16, wherein the weighting function is:

$$w(x, s) \propto \frac{1}{[|\tau_i(x, s)| + 1]^2}$$

wherein:

x is the spatial coordinate;

s is the shot index; and $\tau$ is the determined time shift for the given trace.

18. The program storage medium of claim 14, wherein executing the adaptive focusing further comprises weighting each trace by a weight that is a decreasing function of the magnitude of a magnitude of a deter mined time shift for a given trace.

19. The program storage medium of claim 18, wherein the weighting function is:

$$w(x, s) \propto \frac{1}{[|\tau_i(x, s)| + 1]^2}$$

wherein:

x is the spatial coordinate;

s is the shot index; and $\tau$ is the determined time shift for the given trace.

20. The program storage medium of claim 15, wherein determining for each trace in the gather the amount of time shift includes:

determining the amount of the time shifts from a plurality of low frequency extended images; and assigning those low frequency time shifts to the respective traces.

* * * * *